455-5 AU 233 EX
FTP8102 OR 3,835,387

United States Patent [19]

Rooks et al.

[11] 3,835,387

[45] Sept. 10, 1974

[54] CONTROL CIRCUITRY FOR INFORMATION TRANSMISSION SYSTEM

[75] Inventors: Earnest F. Rooks, El Monte; David E. Lewis, Orange, both of Calif.

[73] Assignee: Columbia Pictures Industries, Inc., New York, N.Y.

[22] Filed: Nov. 15, 1972

[21] Appl. No.: 306,830

[52] U.S. Cl. .................... 325/55, 325/64, 325/308, 340/168 R

[51] Int. Cl. .................... H04q 7/02

[58] Field of Search .................... 325/55, 64, 308; 340/147 R, 167 R, 168 R, 168 CC, 168 S, 169, 157; 343/200, 201, 203, 204

[56] References Cited

UNITED STATES PATENTS

| | | | |
|---|---|---|---|
| 3,233,221 | 2/1966 | Perlin et al. | 340/147 R |
| 3,335,406 | 8/1967 | Clark | 340/167 R |
| 3,384,873 | 5/1968 | Sharma | 325/55 X |
| 3,440,353 | 4/1969 | Salmet | 179/15 BA |
| 3,510,777 | 5/1970 | Gordon | 325/55 |

*Primary Examiner*—Benedict V. Safourek
*Attorney, Agent, or Firm*—Kenyon & Kenyon Reilly Carr & Chapin

[57] ABSTRACT

Logic circuitry for control of advisable converter-tuner stations of a cable television distribution system. The converter-tuners of the system are controlled by logic circuitry responsive to tone bursts modulated on a command carrier. The logic circuitry employs retriggerable one shot element to transform the logical bits of the command signal comprising tones into a clock signal and separate data signal, the clock signal being coherent with the data. The data in the tone bursts are encoded on a command carrier in a split phase mark mode, groups of such tones constituting a command word having address and command portions. A read only memory is used to internally generate the address of the converter receiving the command signal. Comparison circuitry is provided in order that the actual address received may be compared with the internally generated address to determine whether the unit receiving the address is in fact receiving its own address. This serial bit-by-bit comparison halts the further execution of the program by the unit at the first mismatch of an address bit. The read only memory also provides signals to control the response of the unit to the command portion of the command message in the event that the unit receiving the command message is the one addressed by the address portion thereof. A data presence detector automatically resets the system on the expiration of the command word transmission.

36 Claims, 8 Drawing Figures

PATENTED SEP 10 1974 3,835,387

CONTROL CIRCUITRY FOR INFORMATION TRANSMISSION SYSTEM

BACKGROUND OF THE INVENTION

1. Field of the Invention

This invention relates to the field of logic control circuitry for use particularly in information transmission systems, especially in subscription television systems.

2. Description of the Prior Art

It is known to provide a cable television distribution system carrying on its cable both standard broadcast television signals and separate carriers of frequencies different from standard broadcast. The separate carriers each may be modulated with information comprising a secure channel television signal. Such systems further provide adjustable conversion means to selectively convert the secure channel signals to a frequency corresponding to that of a standard television broadcast channel, so that it may selectively be rendered receivable by a conventional television receiver.

It is further known to provide means for impressing on the cable additional command signals, these signals carrying address information corresponding to particular subscriber stations. Each subscriber station in such a system is equipped with sensing means capable of responding to its unique address in instances in which that address is propagated.

Typically, such systems are also equipped with "answer-back" means whereby, when addressed, an individual subscribed station generates a signal on the cable which is detected at a central station, and which indicates whether a secure channel is being viewed, and which one. This information is then compiled for accounting and/or audience survey purposes. Additionally, it is known to include command information with the address signal propagated on the cable, such that individual subscriber stations may be commanded to change state in a prescribed manner.

One of the major obstacles to successful commercial application of such systems is its inherent complexity, and its consequent substantial expense.

Another difficulty pertains to the expense and complexity required to generate clean, sharp signals for addressing the subscriber stations and ordering the execution of commands. Related to this problem is the fact that often, separate clock and data signals must be generated at the subscriber stations in order to properly read and respond to the information in the command signal. Additionally, separate circuitry has previously been necessary to provide for (1) address reading and verification and (2) control of the addressed subscribed stations.

Previous systems have often required the use of multiple frequency address and command signals, (and expensive frequency gating in the subscriber stations) in order to so accomplish the reading and verification of the command word signals. In such systems, it is evident that the number of characters in each address or command signal is limited by the number of frequencies used and as more frequencies are used, cost rises rapidly.

Prior art systems have required additional circuitry, for providing information as to what secure channels are enabled at each interrogated subscriber station before the desired condition of operation be obtained by a further command.

With these problems in mind it is an object of this invention to provide a television cable distribution system which is substantially reduced in complexity and expense when compared with those of the prior art.

It is an object of this invention to provide a television distribution system in which the effect of distortion and irregularity in the address and command information transmitted to the subscriber stations is minimized.

It is a further object to provide a cable television distribution system in which the same circuit components are used to both generate a clock signal for use in the subscriber station units and isolate the data portion of the encoded address command word on the cable.

It is a further object to provide circuitry for a cable television distribution system at the subscriber station which provides both unique address control and command sequence program control.

It is another object of this invention to provide a means whereby, whenever the subscriber stations are addressed with an address signal, each station internally generates its own address, and simultaneously compares that internally generated address with the actual address being transmitted on the cable, halting the execution of the program in all subscriber stations at which the actual received address differs from the internally generated address.

It is still another object of the present invention to provide a cable television distribution system further incorporating circuitry which eliminates the need for a command signal station to sense the condition of the addressed subscriber station prerequisite to establishing a new reception condition therein.

SUMMARY OF THE INVENTION

This invention relates to logic circuitry for use with cable television distribution converter-tuner units for actuating selected of such units in accordance with a command word encoded on and propagated along the cable to the stations.

Command and address information in the form of a command word comprising tone bursts are encoded on a carrier in a split phase mark digital manner. The command word includes an address portion and a command portion. A tone detector detects the tone bursts which comprise the split phase mark signal and provides an output only when a tone is present, the edges of such output corresponding extremely closely to those of the actual tone bursts. An edge detector generates an edge pulse whenever the output of the tone detector changes state. These edges, their sequence and their timing, are directed to a clock generator circuit, which generates a clock signal marking the beginning of each bit cell of the command word being transmitted, and simultaneously generate a data signal including only the actual data which is present in the command word which is encoded on the cable.

The clock signal is directed to a counter which sequentially actuates a read only memory to produce a succession of profiles at its outputs dependent on the state of the counter.

One of the outputs of the read only memory is programmed to generate, during the address portion of the command word, its correct address. This address is fed to comparator circuitry which simultaneously compares the internally generated correct address with the actual address received over the cable. If the addresses match, the subscriber station until will go on to execute whatever command information is present in the command word. If the internal address does not match the received address, the program is halted, and the subscriber units whose addresses do not match do not go on to complete the program and thus do not complete the command operations as indicated in the command portion of the command word.

Where the addresses do match, another function of the read only memory (by way of another of its outputs) is to initiate the operation or command steps by virtue of an enabling signal which is emitted in the bit immediately following the address portion of the command word. This signal enables an operation bit latch which in turn partially enables each of the plurality of channel latches. The condition of each channel latch determines whether its associated channel is receivable on the television receiver. This selectivity is accomplished by connections to the local oscillator of the converter of the converter-tuner subscriber unit.

Subsequently, each channel latch is sequentially fully enabled by the read only memory, during the remaining bits of the command word through still other outputs of that memory. The sequencing of this enablement is made possible, as in the case of the address generation, by the counter assuming successive states as the counter advances with continuation of the command word.

When each channel latch is further enabled by the presence of its unique signal from the read only memory, that channel latch assumes a condition dependent upon the state of the actual data which its input over the cable during the logical bit of the command word in which the channel latch is fully enabled.

It can be seen that the logic circuitry of this invention provides means for detecting tone bursts constituting the command word which means is not influenced by irregularities and distortion in individual states of the logical bits of the command word which is encoded. The read only memory device successfully dovetails the address reading and verification and control sequence programming functions of the device. The serial bit by bit comparison between the internally generated address and the actually received address reduces the complexity of the system by eliminating the need for multi-frequency command information, without limiting the length of the address word sequence. The command execution circuitry, including the operation bit latch and channel latches eliminates any need for providing information relating to the present state of the converter unit as a precondition to establishing a new desired condition. Finally, the circuitry of this device is equipped with a data presence detector which is responsive to the absence or termination of a command word on the cable input to reset the necessary elements of the circuitry in order to render it prepared to operate on a new command word.

DESCRIPTION OF THE PREFERRED EMBODIMENT

Description of Tuner-Converter

Figure 1:
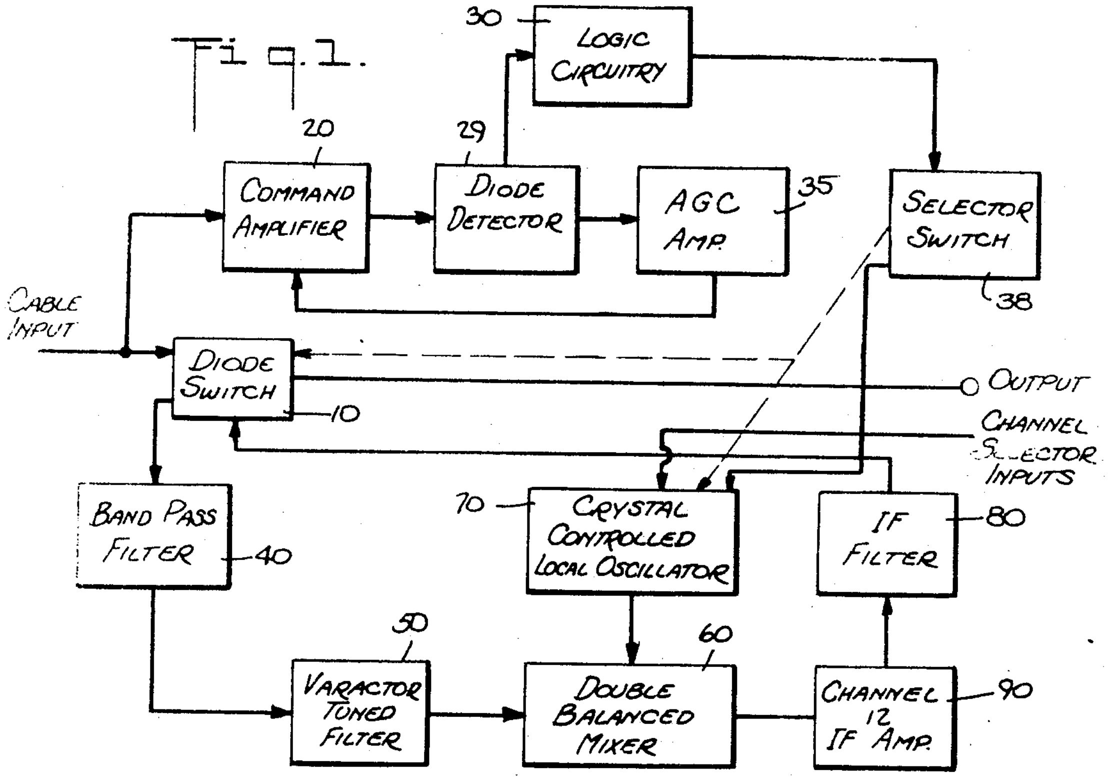
FIG. 1 is a block diagram of a converter-tuner apparatus designed for use in connection with the logic circuitry of this invention.

Referring now to FIG. 1, there is shown a block diagram of the converter-tuner unit. The input to diode switch 10 is the main cable of the system. In addition to conventionally transmitted standard broadcast television signals, this cable bears one or more carriers in the television midband range, each of which midband carriers is modulated with a different signal. Each midband channel represents one of the secure channels of this system.

Also present on the input cable is a command carrier having, for example, a frequency of 115 megacycles. The command carrier is modulated with a command signal, in the form of 200 khz tone bursts. These tone bursts are timed such that groups of them, when modulated on the command carrier, represent a digital command word. The command word contains both address and command information. The command word is ultimately directed to logic circuitry 30. The logic circuitry in turn generates signals for verifying the address and executing the commands present in the command word.

The tone bursts representing the command word may be modulated on the command frequency in any acceptable fashion, such as by mixing with the command frequency of 115 mhz an additional frequency of 114.8 mhz.

Pin diode switch 10 is essentially a two position switch, controlled by selector switch 38. When in the "off" position (which is described below), switch 10 connects all standard television and secure channels directly to the television receiver by way of the output indicated in FIG. 1. This has the effect of delivering directly to the television set the standard broadcast channels which may then be received in conventional fashion.

Whenever the selector switch is set to a position corresponding to reception of one of the secure channels, switch 10 is electronically set up to deliver the cable input to the converter tuner system, such that the selected one of the secure channels may be converted for reception.

In all cases, the cable input is directed to the input of command amplifier 20. Command amplifier 20 is a tuned RF amplifier which amplifies the command carrier, and the signals modulated thereon, while substantially rejecting the midband carrier frequencies on the input. Diode detector 29 serves to demodulate the tone bursts representing the command word from the amplified command carrier signal. Detector 29 directs the command word tone bursts to logic circuitry 30. Logic circuitry 30 determines whether the address portion of the command word corresponds to the address of its associated converter-tuner, and, if so, further generates signals in response to the command portion of the command word.

By means of cooperation with selector switch 38, the signals generated by logic circuitry 30 in response to the command portions of the command word are appropriately applied to the local oscillator 70 of the converter-tuner unit in order to enable the conversion and reception of a selected one of the secure channel carrier signals, i.e., those channels enabled by the response of logic 30 to the command information.

AGC amplifier 35 generates feedback to command amplifier 20 in order to assist in maintenance of a consistent level of the energy of the modulated signal.

When the diode switch 10 is in the "on" position, which position it reaches by virtue of selection of any of the secure channels on the selector switch, the cable input signals are directed to band pass filter 40. Band pass filter 40 has a pass band, for example, of from 120 to 165 mhz. As will be discussed, all of the secure channel carrier signals are within this pass band. Band pass filter 40 serves to reject the command carrier signal, and any other signals or noise which may lie without its pass band.

The remaining secure channel signals passing through band pass filter 40 are directed to tuned band pass filter 50. Tuned band pass filter 50 has a very narrow pass band, on the order of six mhz. The center frequency of the pass band can be adjusted by means of varying the voltage on varactors (variable capacitance diodes). This adjustment is also made in response to the position selected on the secure channel selector switch 38. Selector switch 38 can suitably operate a potentiometer or similar element in order to vary the varactor voltage, (varying the pass band frequency of the band pass filter 50) as a function of the channel selected.

The various voltages applied to the varactors in response to the selector switch positioning are such that when the selector switch is turned to a particular secure channel, the pass band of tuned band pass filter 50 will be centered on that selective secure channel, while substantially rejecting all other frequencies.

From tuned band pass filter 50, the selected secure channel carrier and its modulated component is directed to double balanced mixer 60. The use of double balanced mixer 60 further eliminates any spurious signals which may be present with the secure channel signals. Double balanced mixer 60 provides a high dynamic range capability for the secure channel signal. The output of crystal controlled local oscillator 70 is combined by mixer 60 with the carrier signal of the secure channel to convert the secure channel signal to that of a standard television broadcast channel, such as channel No. 12.

Crystal controlled oscillator 70 is a transistor oscillator. The oscillator also includes four frequency control crystals, each of which has a particular overtone resonant frequency which, when mixed with the appropriate one of the secure channel midband carriers, converts that channel to a standard broadcast channel, which can be directly received by the receiver. It has been found that a preferred standard channel to which the signal is ultimately converted is standard television channel 12 which comprises the band of 204 to 210 mhz. In channel 12, the video carrier frequency is 205.25 mhz while the sound carrier frequency is 209.75 mhz.

The number of crystals for oscillator 70 and consequently the number of precisely controlled oscillator frequencies corresponds to the number of secure channels on the cable input which may be selected by the selector switch 38. Each crystal is provided with separate diode switching apparatus. When a signal, for example, 18 volts is applied to a given diode switch, the switch connects one of the crystals into the tank circuit of the local oscillator. Selector switch 38 directs the switching and voltage to the switch associated with that crystal which is suitable for receiving the selected channel.

If the logic circuitry 30 has been directed by the command portions of a properly addressed command word to enable the reception of a selected channel, the logic circuit output will generate an output to enable the oscillator transistor to function as an oscillator. Selector 38 directs the logic output corresponding to the selected secure channel to the oscillator. If the logic circuitry has been enabled to make possible the reception of secure channel by an output signal corresponding to that secure channel, then the oscillator will be enabled by the logic output when selector switch 38 is turned to that secure channel. Thus the selector switch directs the logic for a given channel to the oscillator when the selector is set to the given channel. At the same time the selector enables the frequency control crystal for the frequency of the given channel.

The frequency converted signal (converted to channel 12, for example) which bears information from one of the secure channels, is then directed to IF amplifier 90 which has an IF frequency corresponding to the band of channel 12, for example. From there it is passed to IF filter 80, which further strips off extraneous signals and noise. The signal which has been frequency converted to channel 12 signal is now ready for reception. The frequency converted signal is directed back through diode switch 10 from which it is conducted to the output of the tuner converter system and directly to the television receiver input where it may be received when the television receiver is set to receiver channel 12.

Several additional features of the converter-tuner system of this invention are particularly noteworthy. The secure channel carrier frequencies are selected in the midband range of the television channels between the upper and lower bands of channels. The preferred embodiment of the converter-tuner utilizes midband channels A, C, E and G, as designated by the Federal Communications Commission. These channels are each 6 mhz in width and have video carrier frequencies of 121.25, 133.25, 145.25 and 157.25 mhz. respectively.

These channels have been selected according to the criteria that, when mixed with the appropriate oscillator frequencies to convert them to channel 12, the number of the harmonics of the various local oscillator frequencies falling within the midband is at a minimum. This is desirable since the local oscillator radiates whatever frequency it is generating into adjacent portions of the circuitry. This can have the effect of putting spurious signals on the main cable system, which signals, lying within the midband, are potentially receivable by other units on the cable system. Thus, causing noise and other interference could result. The reason for this is that filters 40 and 50 always pass a band of secure channel frequencies lying within the midband.

In order to enable the proper conversion of secure channel frequencies A, C, E and G, for example, local oscillator 70 is conditioned to generate frequencies of 84, 72, 60 and 48 mhz. The only harmonics of these frequencies which are in or near the frequencies of channels A, C, E or G are the second harmonic of 72 mhz and the third harmonic of 48 mhz, each being 144 mhz. This is, therefore, a particularly troublesome frequency. This harmonic frequency can be nulled by providing filter 50 with a resonant circuit tuned to pass 144 megacycles. The resonant circuit resonates at that frequency when it is presented with the 144 mhz harmonic. The resonant circuit is constructed to apply the radiated signal to filter 40 180° out of phase with the 144 mhz harmonic signal being radiated direct by the oscillator. This has the effect of bucking or nulling out the unwanted frequency, which otherwise could get onto the cable, or into other elements of the circuit.

In conventional frequency conversion systems, the local oscillator signals are higher than that of the carrier signals with which they are mixed. This condition has the effect of requiring that substantially high local oscillator frequencies be developed. Such high local oscillator frequencies can require complex circuitry if crystal is to be used. Such an arrangement necessitates the provision of extensive filtering components to block unwanted harmonics. The necessity for such extensive filtering is eliminated in the converter-tuner in which the local oscillator frequencies are selected to be below those of the secure channel carrier signals on which the information to be viewed is modulated.

Where the local oscillator is required to provide frequencies which are higher than the carrier frequencies with which they are to be mixed, frequency multipliers are also often employed. Extensive shielding may be needed in order to block the lower fundamental and harmonics which may lie in the region of the midband frequencies. Thus, the use of a local oscillator frequency below that of the midband secure channel can reduce or eliminate these problems.

The crystal controlled local oscillator being relatively drift-free is not prone to affect or confuse the fine tuning of the television receiver. A local oscillator not having crystal control may have excessive drift. This could require that fine tuning be provided separately for the tuner converter system. An improper adjustment of such fine tuning could make it impossible to fine tune the television receiver to receive the converted signal. Crystal control of the local oscillator eliminates this problem.

Moreover, the converter-tuner is capable of providing a signal to the mixer and ultimately to the television receiver which is considerably cleaner than that which was previously available. The reason for this is the extent of filtering used. Band pass filter 40 first limits the signal passing through it to those of a portion of the midband corresponding to the secure channels. The tunable band pass filter operated by the varactor further narrows the pass band of the signal transmitted to the mixer. The mixer itself is of the double balanced type which further eliminates extraneous signals and noise. Lastly, the IF of channel 12 is filtered one last time before being presented to the input of the television receiver.

Figure 4:
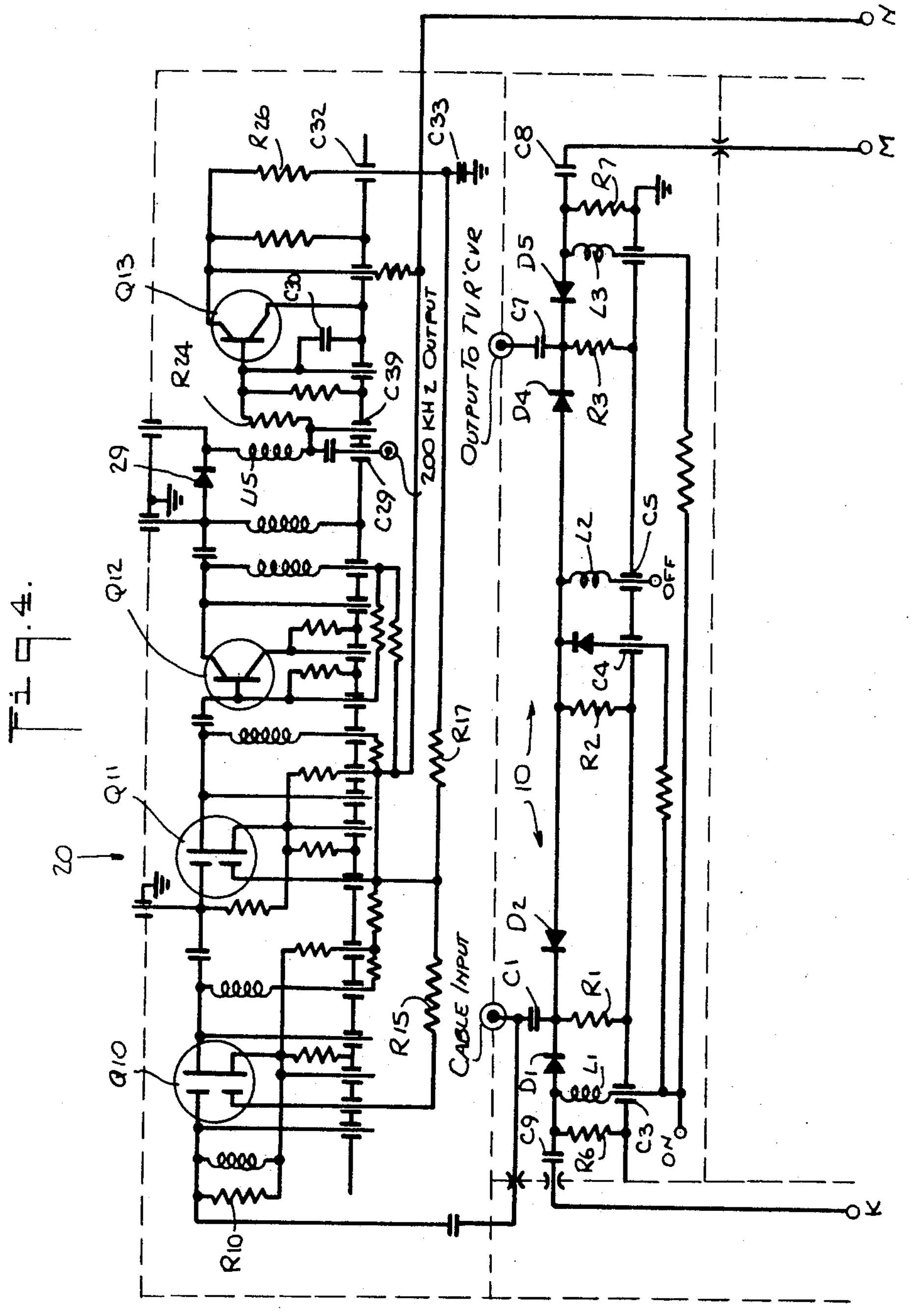
FIG. 4 is a partial schematic drawing of the circuitry of a converter-tuner designed for use in connection with the present invention.

The details of the tuner-converter are shown in FIG. 4, which is a schematic of the entire tuner-converter system. In the upper left portion of FIG. 4 is the command amplifier 20. The tone code signal is coupled into the circuit by capacitor C 10 and resistor R 10 and provides a 200 KHz output through capacitor C 29 by virtue of detector diode 29. The amplifier encompasses transistors Q 10, Q 11 and Q 12, which provide three stages of tuned RF amplification. The output of transistor Q 12 is coupled to diode detector 29 which is in turn connected to a low pass filter consisting of coil L 15 and capacitor C 39. The output of the 200 KHz amplitude modulated carrier through capacitor 28 coupled by the filter to a low pass filter comprising resistor R 24 and capacitor C 30. The purpose of this is to develop a DC voltage at the base of transistor Q 13 which is proportional to the RF energy applied at the input and therefore proportional to the DC components of the signal being developed at diode 29. Therefore, transistor Q 13 serves as an automatic gain control amplifier which provides a voltage proportional to the amount of voltage developed across capacitors C 39 and C 30.

The DC voltage developed across capacitor C 30, as a result of rectifying the RF energy across diode 29 is a function of the amount of signal strength applied back at the input of transistor Q 10. This DC energy is amplified by transistor Q 13, filtered by resistor R 26 and capacitors C 32 and C 33, and reapplied as an AGC control voltage through resistor R 17 to transistor Q 11 and through resistors R 17 and R 15 to transistor Q 10 at the control gates.

The purpose of the command amplifier 20 is to detect and amplify any 200 KHz amplitude modulation on the command carrier, which is the input to both the amplifier converter-tuner. This is one way of providing the command words which are directed to each converter-tuner unit in the entire system. The 200 KHz pulses thus modulated on the carrier (which is in the neighborhood of 115 mhz. are the pulses or tone bursts which are applied to the logic circuitry, hereinafter described, which controls the converter-tuner unit. A suitable way of producing these 200 KHz tone bursts, for example, is to intermittently introduce a 114.8 mhz. carrier with the 115 mhz. carrier.

The diode switch 10 includes PIN diodes D1–D5. The coils L1, L2 and L3 and related capacitors C8 and C9 are provided as the means by which these diodes can be forward or back biased as desired to direct a signal through the tuner or directly through the switch to the output to the television receiver.

If a positive voltage is applied to the point directly below capacitor C 3 (the "on" condition), this will forward bias diodes D1, D3 and D5 and back bias diodes D4 and D2. In this condition diodes D2 and D4 both become a high impedence; diodes D1, D3 and D5 becoming low impedences. This condition yields an effective blocking of the input signal from the output terminal by providing a path for the input signal towards capacitor C9, not through diode D2; however, any current that leaks through diode D2 will be shorted to ground by diode D3. The high impedence at diode D4 yields further blocking.

Any signals passing through the converter and returning back from the converter toward the output terminal through capacitor C8 will find a low impedence path at diode D5 through capacitor C7 to the output terminal.

On the other hand, if a voltage is applied at the terminal located directly below capacitor C5 and coil L2 (the "off" condition), the situation becomes reversed. A back bias is applied to diode D3, raising the input impedence and therefore removing any shunt effect. A forward bias is applied to diodes D2 and D4 which in turn makes these low impedences which provide a through path from the cable input to the output to the TV receiver. Therefore, in this "off" mode diodes D1 and D5 are back biased because of the low impedence to ground reference provided by resistors R 6 and R 7. As a result, the current flow through diodes D2 and D4 tends to back bias D5 and D1. This effectively opens the circuit and removes any load to the input or the output which might be presented by the tuner elements. When the switch is in the "on" condition, signals pass through the tuner. When the switch is in the "off" condition, signals pass directly to the switch through the switch and are isolated from the tuner, including from the toner's characteristic impedences.

Figure 5:
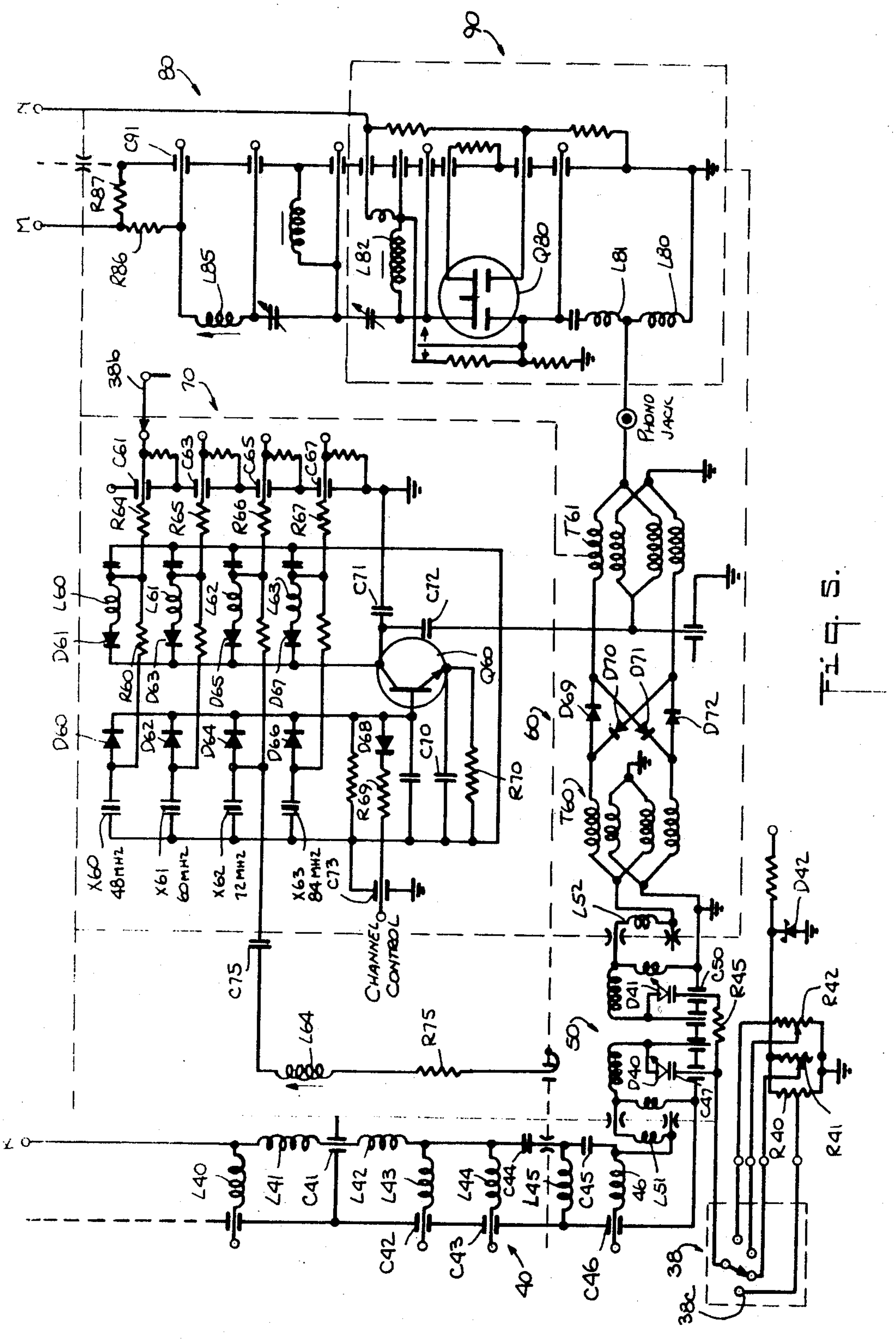
FIG. 5 is a partial schematic drawing of the circuitry of a converter-tuner designed for use in connection with the present invention, the circuit of FIGS. 4 and 5 being joined at terminals K, M and N.

When diodes D1, D3 and D5 are forward biased, signals applied at the cable input through capacitor C1 pass through diode D1, and then through capacitor C9. They are not shunted by resistor R6 because of the high impedence or by coil L1 because of the high impedence. Instead these signals are applied directly to the junction of coils L40 and L41 which, in conjunction with capacitor C41, coil L42 and the other related elements extending down to coil L46, provide a band pass filter 49 (FIG. 5) Filter 40 effectively passes frequencies between 120 and 165 mhz. and substantially rejects all frequencies outside that band.

The RF ground of capacitors C47 and C50 and tie point characteristics of capacitors C48 and 49 together comprise a tuned band pass filter 50. The center frequency of the pass band is determined by the selected voltage applied at the junction of capacitor C47 and resistor R45, which influences varactors D40 and D41. This voltage is delivered from voltage dividers (resistors R40, 41 and 42) through a wafer of channel selector switch 38. The channel selector switch, simply picks the voltage available on the voltage dividers depicted at R40 and R41 and R42 which are in turn supplied a voltage which is regulated (to 18 volts for example) by the zener diode D42. The output of the potentiometer will, depending upon the channel selected, determine the capacitor of the varactors in the filter and cause the pass band of filter 50 to be centered on the channel selected. The coils L51 and L52 provide some isolation between the tuned circuit elements and the input and the output interface circuits to permit more practical control of the band width of the tuned circuit.

The tuned circuit has an output band width of approximately 6 mhz. The tuned circuit output is applied to the input of the double balanced mixer which include transformers T60 and 61 and diodes D69–D72. The input to mixer 60 which is driven by the local oscillator is applied through capacitor C72 to the center point of the balanced transformer T61. The unbalanced output of this double balanced mixer appears at a phono jack 61 (for test purposes only) and is subsequently applied to the tuned input of transistor Q80. Transistor Q80 is the active input in the channel 12 IF amplifier 90.

The local oscillator 70 includes transistor oscillator Q60. Transistor Q60 is biased by resistor R70, bypassed by capacitor C70 and its base feed is controlled by diode D68 and resistor R69. Transistor Q60 oscillates by virtue of tuning the base with a selected crystal of crystals X 60, 61, 62 and 63 for the desired frequency and by tuning the collector with a parallel resonant LC circuit. The four parallel resonant circuits each include one of coils L60, 61, 62 and 63. The desired oscillator frequency is an overtone of the base frequency of the crystal. For example, in order to operate the 48 mhz. section a switching voltage is applied through capacitor C61 and resistor R64. This DC voltage continues on through resistor R60 and forward biases diode D60. This connects the X60 crystal (48 mhz.) to the base of Q60. The same voltage forcing current through coil L60 forward biases diode D61, connecting coil L60 to the collector. Coil L60 in turn parallel resonates with capacitor C71 to provide a parallel tank circuit operating at 48 mhz. Hence the oscillator operates at 48 mhz. To change the frequency the point at which the switching 18 voltage signal is applied is changed. If the switching voltage is supplied through capacitor C67, it would forward bias only the diodes D66 and D67. This would bring into play the 84 mhz. crystal X63 and the coil L63, also parallel resonating with capacitor C71. The point of application of the switching voltage is determined by the selector switch position. Mechanical or electrical switching is provided to place the switching voltage on that terminal of the terminal connected to resistors R64, 65, 66 and 67 which connects the proper crystal to the oscillator such that the oscillator frequency converts the selected channel to channel 12.

The output of this oscillator is coupled through capacitor C72 to a mixer 60. The output of the mixer which is applied directly to the tuned input of transistor Q80 is amplified by the tuned IF amplifier 90 and applied to the output through a three state tuned IF filter 80 including the components beginning with coil L82 and ending with coil L85, in conjunction with capacitor C91.

Resistors R86 and R87 provide impedence matching between filter 80 and the output to develop a selected output impedence such as, for example, 75 ohms. This signal progresses from resistor R86, to capacitor C8, and then to diode D5, which has been forward biased by the "on" command to the diode switch.

The RLC circuit of coil L64 and resistor R75 and capacitor C75 is resonant to an unwanted band oscillator harmonic frequency such as for example, 144 mhz. This circuit applies the harmonic in reverse phase by capacitive or inductive coupling to filter 40. This bucking signal cancels out the unwanted harmonic signal emitted by the oscillator, thereby preventing its intrusion onto the main cable or elsewhere.

Description of Logic Circuitry

Figure 6:
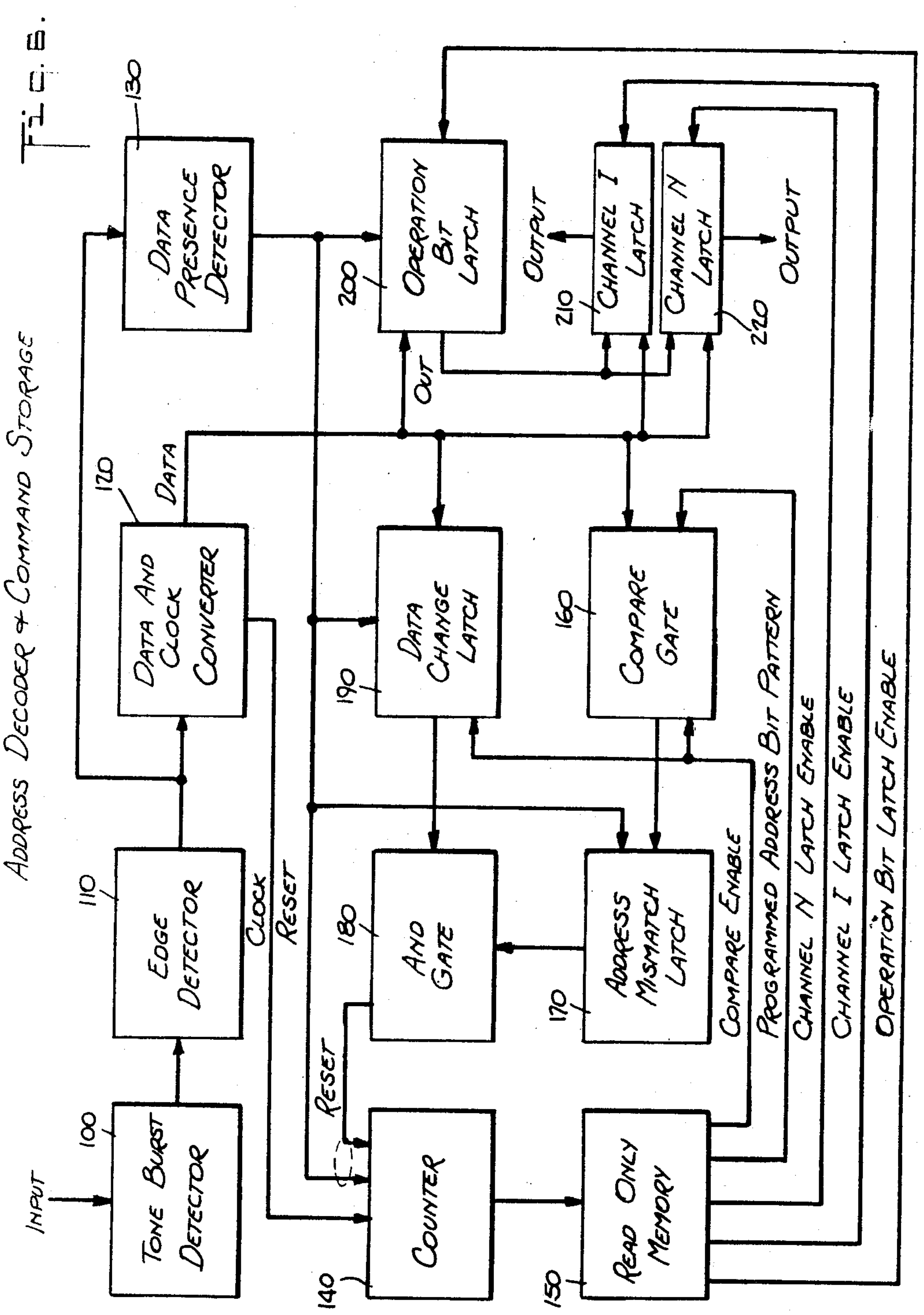
FIG. 6 is a block diagram of the logic circuitry of this invention.

FIG. 6 shows a block diagram of the basic control logic circuitry. Command tone bursts are the input to tone burst detector 100 from the command amplifier of the converter unit. These command signals (for example, of a frequency of 200 khz) are derived from the incoming information on the main cable in the fashion described above. The information on the command signal tone bursts is represented in a split phase mark digital fashion of encoding.

Tone burst detector 100 serves to provide an output response of a rectangular wave configuration, the duration of the higher output stage corresponding to the duration of the command signal tone bursts delivered to the input of the tone burst detector. Tone burst detector 100 is constructed such that it imparts a sharp or "clean" definition to the input pulses. The tone burst pulses generated by the tone burst detector are delivered to edge detector 110 which emits a pulse of short duration each time the output of the tone burst detector changes state. These edge signals are then directed to clock converter 120.

Data and clock converter 120 derives from the edge signals both a return to zero data pattern and a coherent clock signal from the split phase mark input. Thus, data and clock converter 120 generates a clock signal pulse at the beginning of each bit cell of the split phase mark signal input to it, and additionally, provides a data signal within each bit cell which indicates whether the bit is a logical one or a logical zero. Information is sent on the cable of the system in command words, consisting of a succession of bits, part of which are allocated to address, and part to command functions.

Tone burst detector 100 exhibits a bi-level output which assumes one state when the input tone burst is present and the opposite when the input tone burst is absent.

The data signal generated by the data and clock converter 120 changes state at every bit cell boundary and at the midpoint of every logical one bit. It remains constant for the duration of every logical zero bit. This is the definition of split phase mark coding. The data and clock converter 120 generates an RZ data output which consists of a true pulse during each one bit and no pulse during each zero bit. The clock output signal is simply a rectangular pulse emitted at the beginning of each bit cell.

Data presence detector 130 is a retriggerable one shot device whose output becomes true when a first edge pulse is input to the data presence detector. The output becomes false only if succeeding edges do not appear within the time interval of the one shot of the device. The one shot time is set to be a period longer than the maximum time between edges when logical bits forming words are being transmitted to the input of tone burst detector 100. Data presence detector 130 emits a reset signal if a bit does not appear within the one shot interval, indicating the end of a particular command word. The effect of this reset signal will be discussed below.

The clock signals are input to counter 140. Counter 1 is a binary counter which advances one step with each successive clock pulse. The output of counter 140 drives a read only memory 150 which has a plurality of outputs. Read only memory 150 puts out a unique word on its group of outputs for each discrete state of the counter. Thus, the various outputs of the read only memory assume a set of profiles, each of which profiles is characteristic of one state of counter 140. If only one output is considered and the counter is put through each of its successive states, the one output of the read only memory which is considered will assume a succession of states, this succession of states forming a logical word, successive bits of which can be used to carry information.

The read only memory is preprogrammed in one of its outputs, to output the assigned address bit pattern of the particular converter unit with which the read only memory is associated. In this invention, the particular output of the read only memory which is designed to carry the address bit pattern will carry the address as a logical word during those successive states of counter 140 which are assumed during the address bit cells of the command word.

It can therefore be seen that, as counter 140 progresses under the triggering of the clock signals through a succession of its states, which states correspond to the address bit cells, these will be generated at one output of the read only memory a programmed address bit pattern. This pattern is made unique to the associated converter unit. Therefore, under only the triggering of the clock pulses, each unit automatically generates within itself its own address.

The system is equipped with further logical elements which serve to detect whether the data coming in during the address portion of the command message transmitted is in fact its own address. It does this by generating its own address internally under the stimulus of the clock signal and by comparing the incoming data (which contains the address of the address converter unit) with its internally generated address and detecting whether the two match.

This comparison takes place in compare gate 160. Compare gate 160 receives both the incoming data signals from the clock converter 120 and also the programmed address bit pattern generated by the read only memory. When these two signals do not match, compare gate 160 transmits a signal to address mismatch latch 170. Address mismatch latch 170 when provided with a signal from compare gate 160 generates a further signal which is input to AND gate 180.

AND gate 180 has one more input extending to data change latch 190. AND gate 180 is constructed such that it emits a signal which resets counter 140 when signals are received by AND gate 180 simultaneously from both mismatch latch 170 and data change latch 190. The generation of the reset signal turns counter 140 back to its zero position, and prevents counter 140 from progressing any further in the program or responding in any way to the clock pulses, until the end of the command message being processed.

The function of data change latch 190 is as follows. It is contemplated in this embodiment that there be one particular address which may be sent from the command source and transmitted to the logic circuitry which will cause all of the converter unit to which the signal is directed to respond to the command information within the signal (the command information, as will be explained below, being transmitted in bits of the command message following the address bits). That address is simply the one in which each address bit is a logical zero.

It is evident that, under these conditions, it is undesirable for a reset signal to be generated in all cases in which the internally generated address and the received address do not match. The reason for this is that, quite possibly, the address actually transmitted may be the all zero or "all call" address to which it is desirable that all converter units respond. These conditions can be implemented by rendering data change latch 190 simply a logical element which generates an output only after a logical one signal in the address data received has been detected. Once a logical one signal has been detected, data change latch 190 locks in its condition of providing an output, until it is reset. Resetting does not take place until the command message has been terminated. The termination is sensed by the data presence detector 130. It can be seen that if no logical one bits are present in the address portion of the command message received, and gate 180 can never be satisfied, and the reset pulse will not be sent to counter 140.

The remaining outputs of the read only memory are also preprogrammed to in turn program the operation and other latch gating functions of the unit. It is important to recognize that the maximum number of bits in each command transmission is limited by the number of stages of counter 140. In the preferred embodiment, a 32 stage counter has been employed. Therefore, each command message can be a maximum of 32 bits in length. Of these 32 bits, the first 24 bits have been appropriated to carry the address information being transmitted. Therefore, with respect to that output of the read only memory which is designated as the preprogrammed address bit pattern output, one address may appear only in the first 24 states of that output, as determined by the preprogrammed nature of the read only memory.

It is noted that it would be undesirable for comparison of the internally generated address bit pattern bits and the incoming bits to continue after the command portion of the command word has begun. Therefore, another output of the read only memory is programmed to send a "compare enable" to both the data change latch 190 and compare gate 160, during only the address portion of the command word, i.e., the first 24 bits. During that period, the compare enable signal is a one and it serves to activate the data change latch and the compare gate. After 24 bits, the compare enable signal changes to a state which disables both the data change latch and compare gate.

It can be seen from the foregoing that if an individual unit detects that its own address is actually the one being sent in the address portion of the command word, it will then stop scrutinizing the incoming signals, and merely execute the commands which are received thereafter. Thus, the way in which an individual unit is prevented from responding to the commands in a command word not addressed to it is for the counter 140 to be reset in response to a signal from compare gate 160. This halts any further progress of the unit through the command message and thus it can never get to the command bits. It could, however, receive and respond to the command portion of the command information word were it not for the cessation of its execution of the program by way of counter 140.

It is now assumed that the unit discussed has progressively compared each element of the 24 address bits of the command word and discovered that it is indeed the unit being addressed. It will proceed through the remainder of the program and execute the command which is carried as part of the command word. The next bit immediately following the last address bit actuates still another output of the read only memory. This bit, called "op" or "operation" bit, is true for only one bit, i.e., the bit immediately following the address portion of the command word, in this case the 25th bit. The occurrence of the operation bit, by way of the "operation bit latch enable" output of the read only memory 150, is transmitted to the operation bit latch 200. Responsive to the reception of the operation bit, operation bit latch 200 emits a signal to each of a plurality of channel latches 210, 220. The signal of operation bit latch 200 represents the state to which channel latches 210 and 220 will be set if they are enabled by the state of the data signal in successive bits of the command word. The data is transmitted simultaneously to the second enable line of each channel latch.

Each channel latch has still another enable input. Each channel latch is tied to a different output of the read only memory 150 by "channel latch enable" lines. Each "channel latch enable" line carries an enabling signal for only one bit of the command word. Moreover, the "channel latch enable" signal for each channel latch is present during a different bit for each channel latch.

Each channel latch will be fully enabled to assume the state of the op bit latch 200 only when it is both enabled by the data incoming to it from data and clock converter 120 and by its individual "channel latch enable" signal from the read only memory 150.

This operation, in a sample instance, can be described as follows. In bit 25, the op bit emanates from the read only memory, actuating the op bit latch 200 to provide a status signal to each of the channel latches 210 and 220. The op bit latch signal is then present throughout the entire remainder of the command word. Data arrives simultaneously at each channel latch throughout the remainder of the command word. During bit 26, for example, and only during that bit, the read only memory is programmed to emit the channel 1 latch enable signal. Therefore during that bit, and only that bit, inputs are present on the channel 1 latch from the op bit latch and from the read only memory. Therefore, during that bit the channel 1 latch is enabled to assume whatever state the "op bit" latch presents if the corresponding data bit is true to also enable the channel latch. It will not assume the state of the "op bit" latch in any other bit, because, before and after bit 26, the "channel 1 latch enable" signal from the read only memory 150 does not exist. In like manner, other channel latches can be selectively enabled by their corresponding data bits during the remainder of the command word.

Each of the channel latches has an output having one of two possible states, the state of which being dependent on the condition of the "op bit" latch during the time the channel latch is enabled by the data bit and by the "channel latch enable" signal. Each state of the outputs serves either to enable or disable the associated unit with respect to reception of the channel associated with the channel latch whose output is involved.

Figure 7:
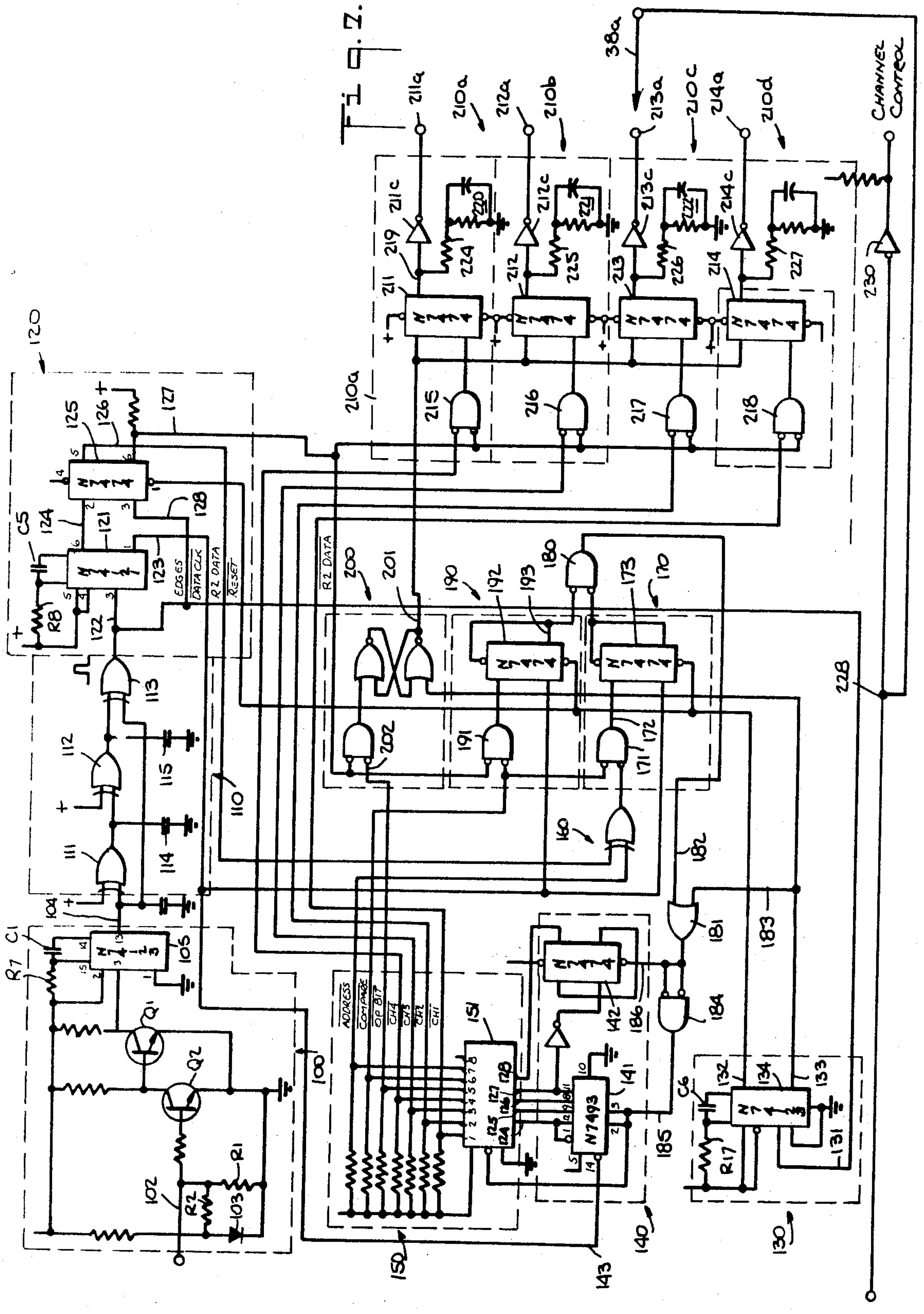
FIG. 7 is a schematic drawing of the logic circuitry of this invention.

The circuitry of the logic of this system is shown in FIG. 7 which is a schematic drawing of that circuitry. In the upper left-hand corner is located tone detector 100. Tone detector 100 is fed through line 102 bursts of alternting voltage derived from the cable line incoming from the command central station. The function of tone detector 100 is to render a rectangular wave output at terminal 13 of integrated circuit 105. The output is at a high value (for example about 5 volts) when the tone is present and at a low value (for example approximately ground) when it is not.

The purpose of using the tone detector 100 is that regardless of the state of the transfer function of the equipment, which might give rise to some distortion in the incoming tones, the output can still be a clean very sharply defined signal, i.e. it will very closely approximate a rectangular wave, notwithstanding there may be some distortion on the input. Tone burst detector 100 also includes transistors Q2 and Q1. Resistors R1 and R2 are used as a voltage divider to split the voltage appearing across diode 103, which voltage, for example, can be approximately .7 volts. This means that a threshold value is provided for the base of transistor Q2. Transistor Q2 is selected to fire at about .7 volts. Therefore, to fire it it is only necessary to provide about .4 volts on line 102. This renders the tone detector quite sensitive to detect the presence of small voltages in the input tone bursts, such that it may respond with only a minimum of phase distortion in its output.

The firing of transistor Q2 causes transistor Q1 to become nonconductive, causing the appearance of a true signal on terminal 3 of integrated circuit chip element 105. This integrated circuit chip, for example, is of the type known in the art by the designation "N74123." It is a "retriggerable monostable multivibrator with clear," that is a "retriggerable one shot" device. Thus when it is triggered at terminal or pin 3, it immediately produces an output at terminal 13 on line 104 which endures for a predetermined period of time. If the trigger pulse appears again at terminal or pin 3 before the expiration of that time period, then the output of pin 13 will be maintained high. If no trigger comes to pin 3 within the time period, output pin 13 on line 104 will fall to near ground again. The time limit between necessary retriggers is established by the reactance elements, resistor R7 and capacitor C1 which are associated with integrated circuit 105. This kind of "retriggerable one shot" is preferred to the use of reactance elements, as in a filter, to hold the output above a given level for a transient. The reason for this is that such reactance elements can require an excessive amount of time in order to get the output up to the required value. With this embodiment, time delay in falling is achieved without a corresponding delay in the response of the output to the input triggering pulse.

Edge detector 110 provides a sharp, narrow edge pulse whenever the output state at line 104 goes from low to high or high to low. This is done by two successive inversion and delay steps, followed by an exclusive OR comparison. Exclusive OR gates 111 and 112 are connected as inverters with one input of each attached to a constant voltage source. Capacitors 114 and 115 provide the delay function. The output of exclusive OR gate 112 is one input of exclusive OR gate 113. The other input of gate 113 is the raw output of the tone burst detector 100 appearing at line 104. Thus, gate 113 has two inputs, each carrying the signal from tone detector 110, but one of them being slightly delayed. This means that every time the output on line 104 changes state, gate 113 will output a short pulse indicating an edge.

Figure 8:
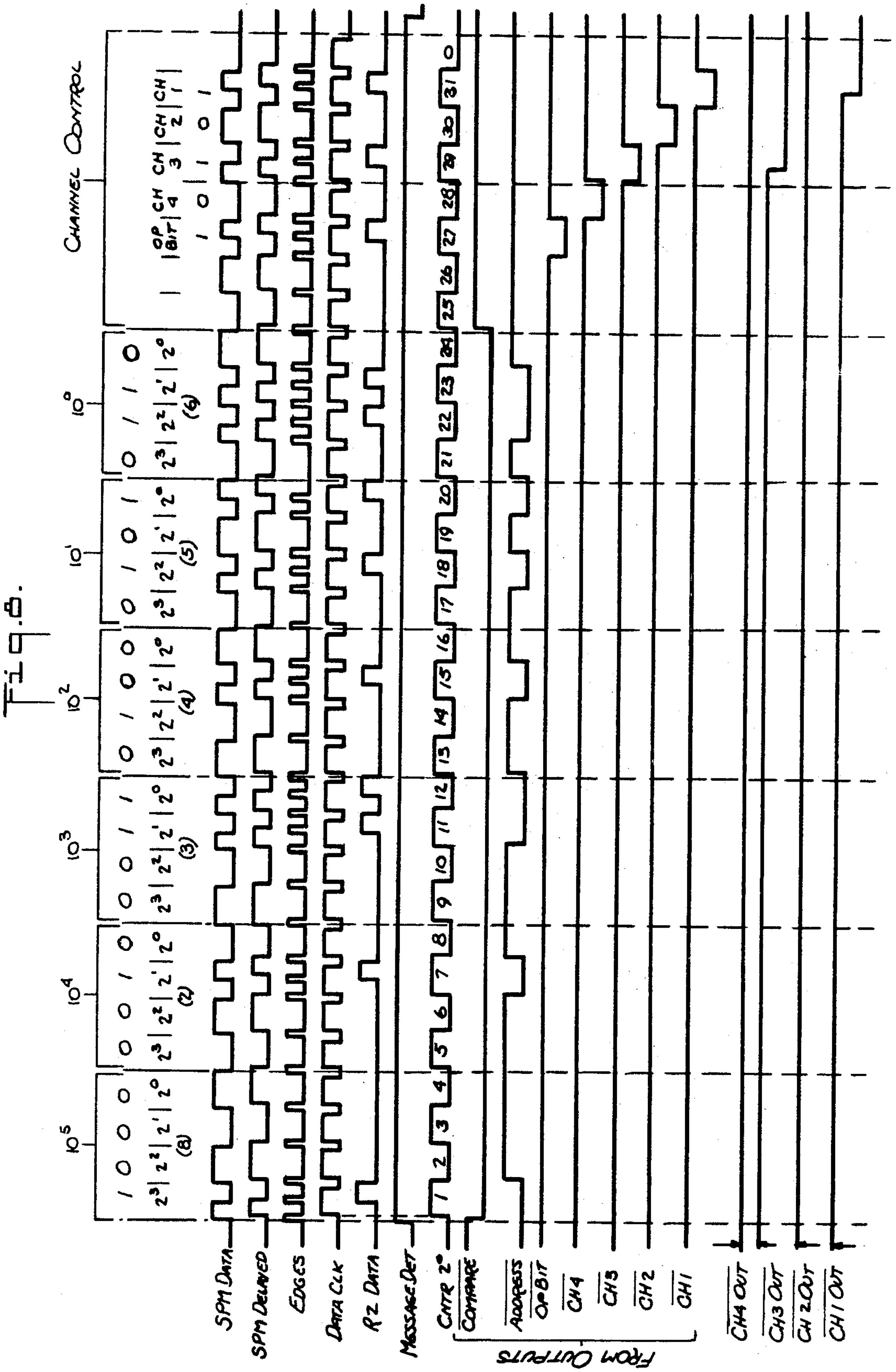
FIG. 8 is a graphical time-based representation of various signals appearing within the logic circuitry of the present invention.

It should be noted that the information dealt with in the logic system herein described is encoded as biphase mark or split phase mark information. The definition of such encoding is that to indicate a logical one bit, the value of the signal makes a transition somewhere near the middle of the bit cell. If the logical bit to be transmitted is a zero, the value, whatever it is, remains the same throughout the entire bit cell. Thus, it is not the level (up or down, high or low) of the signal which carries the information in split phase mark encoding, but only the fact of whether or not a transition in level occurs during the middle of the bit cell under consideration. Split phase mark data is illustrated in the uppermost wave form shown in FIG. 8, entitled "SPM DATA." For example, the first 12 bit cells shown in this drawing carry their respective values of 1,0, 0, 0, 0, 0, 1, 0, 0, 0, 1, 1. The line entitled "SPM DELAYED" illustrates the wave form which appears at the output of gate 112 in the edge detector. The line described as "EDGES" represents the wave form of the output of gate 113.

Note that in SPM DATA, there is always a change of state at the end of each bit cell, regardless of whether there is also a transistion in the middle. Thus, an edge appears at the beginning of each bit cell, regardless of whether the bit cell contains a logical zero or a logical one. If, however, the bit contains a logical one, there is also a transition, and consequently another edge in the middle of that bit cell.

In order to derive a clock signal which is simply a pulse initiated at the beginning of each bit cell and to isolate any additional transitions that may take place within individual bit cell which bear 1 logical information, integrated circuit 121 is employed. Circuit 121 is a "chip" identified by the designation "N74121." It is a "monostable multivibrator," that is a "one shot" device; but not retriggerable. That is to say, when an edge pulse appears at the output of gate 113, it is transmitted to circuit 121 over line 122.

With the arrival of each edge pulse 122, a clock signal is output therefrom on line 123. This signal is a pulse which is programmed by proper choice of resistor R8 and capacitor C5, to last for 75 percent of the duration of the bit cell. It has been found that a bit cell of 1 millisecond is appropriate for use with this device, so that the endurance of the signal appearing at line 123 which results from a pulse at line 122 is approximately ¾ millisecond. Since circuit 121 is not retriggerable, it simply produces an output which rises when a pulse appears at line 122 and falls ¾ millisecond later, regardless of any intervening pulses.

Therefore, it can be seen that circuit 121 serves to provide a clock signal which appears only at the beginning of each bit cell, and is uneffected by the additional transitions which take place in logical bit cells which contain logical 1 information. The inverse of the clock signal appearing at line 123 appears also at line 124. Having derived a clock signal which is initiated at the beginning of each bit cell, it remains to derive a signal which isolates the data appearing in each bit cell, i.e., indicates whether there is or is not a transition in the middle of the bit cell. This is done by means of integrated circuit 125 which is a dual D-type edge triggered flip-flop designated N7474. In order for there to appear an output on either of lines 126 or 127 (each of which is the inverse of the other) there must be a signal at its input 124 and at its other input 128. When this condition takes place, output 126 goes true and output 127 goes false for the duration of the bit cell.

It can therefore be seen that the only edges to which circuit 125 will respond with an output are those edges which occur in the middle of a bit cell since in all cases the output 124 of circuit 121 has fallen to zero before the end of each bit cell. Therefore in the case of a one bit, outputs appear at circuit 125 for the last half of the associated data bit, but no such outputs appear in the case of a zero bit. Thus, the transitions indicating the existance of each one bit are by this circuitry isolated to be applied in a manner discussed hereinbelow.

The inverse clock signal is directed to input line 143 of counter 140. Counter 140 includes two integrated circuits. The circuit designated 141 is a "4-bit binary counter" designated as N7493. The circuit 142 is of the type designated N7474 which has been referred to above. Counter 141 counts successively with each clock signal received until it counts from zero through 31 bits. The counter will then repeat if other clock signals arrive. The outputs are designated as the five lines 124–128.

It can be seen that counter 140 can provide 32 different addresses by its combined outputs and will traverse each of those addresses if actuated to do so by the arrival of a like number of successive clock pulses. In the disclosed embodiment the addresses of the counter can correspond successively to a binary count from 0 to 31 delievered along lines 124–128.

The outputs of counter 140 are connected to "read only memory" 150 which is a 256 bit field programable read only memory organized as 32 "words" with 8 bits per word. "Words" are selected by 5 binary address lines 124–128. By way of example, read only memory 150 can include a read only memory device 151 manufactured by Signetics, 811 East Arques Avenue, Sunnyvale, California 94086 and designated as Signetics Type 8223 "FROM 256 Bit Bi-Polar Field Programmable Read Only Memory". Thus the read only memory is capable of successively presenting 32 "words" over 8 outputs. The "words" which the read only memory present for each successive binary counter address are preset by conditioning the read only memory 151 it is installed in the system.

Even though the eight outputs of the read only memory have been described as comprising a "word" for each binary count input thereto, in the disclosed system the "word" output is not used as an element of information but instead is processed as 8 separate bits which comprise a given "word."

When each output or bit of read only memory 150 is considered separately, it can be seen that for a plurality of successive binary count inputs, each output can comprise a particular binary word. Thus each output 1–7 (output 8 not being used) carries a binary word.

Thus, for example, the read only memory output (line 7) which is connected to the line labeled "address" is conditioned to assume a particular sequence of bits wich express a binary number in response to a sequence of binary count inputs. Therefore it can be seen that this logic unit, in response to a clock signal at the counter indicating the beginning of each bit cell, can internally generate a particular address, on the address line, expressed in binary form. Similarly a signal is simultaneously produced on each of output lines 1–6.

If the internally generated address from line 7 matches the address of the associated tuner converter unit, then means can be provided whereby the system can sense the occurrence of a corresponding incoming cable transmitted address (designated RZ data). Thus the system determines whether its assigned address generated in the read only memory in response to the clock signal corresponds entirely with the address actually being received.

This is done partially by the use of compare gate 160, which is an exclusive OR gate. Input to gate 160 is the address output of the read only memory and the actual data arriving over the cable. If they are mismatched, a true signal appears at the output of gate 160, which is directed to the inverted input of AND gate 171. The other input of gate 171 is connected to "compare" enable signal from read only memory 150. This "compare" enable signal is used to limit the number of bits in which the comparison step is executed to only those bits of each command word which constitute the bits which are allocated for the address. Thus, the "compare" enable signal will be present during each of the counts of counter 140 which correspond to the bits constituting the address portion of the command word. When both the "compare" enable signal and a mismatch signal are applied to gate 171, an output is transmitted over line 172 to circuit 173.

Integrated circuit 173 is also a N7474 chip. The other input of circuit 173 is connected to the "data clock" signal transmission line. When the clock pulse and the mismatch pulse are both inputs to circuit 173, the circuit emits a signal which is directed to one input of AND gate 180. The other input of AND gate 180 is connected to the output 193 of circuit 192 which is a component of data change latch 190. Circuit 192 exhibits an output at 193 only when a "one" logical bit appears in the address which is actually received over the data line. This can be seen if one notes that gate 191 has "RZ data" as one input and the "compare" enable signal as the other. The "compare" enable signal as in the case of the address mismatch latch is present throughout the entire period of the address portion of the command word being received.

Therefore, it can be seen that the conditions for an output, at gate 180 are fulfilled whenever the internally generated address fails to match the received address in any of its bit cells, and a "one" signal has been received as part of the address.

The reason for introducing the additional condition that there be an output in response to a mismatch only if there is also a previously received one bit in the address is that it is intended that this system will have an "all call" address capability consisting of zeros. The results of an output on gate 180, as will be discussed below, is a resetting of the counter in the associated unit and a consequent halting of its progress through the program dictated by the received command word. Therefore, it no one bit has yet been received, the incoming signal may still be an "all call," and therefore there is introduced the additional condition for resetting that there has been a received one.

If, however, there has been a one bit received, and also a mismatch between the internally generated address and the received address, an output appears at gate 180 which is directed to the input 182 of OR gate 181. OR gate 181 exhibits an output whenever either of its inputs is true. Thus, the appearance of an output at gate 180 will also actuate gate 181 and gate 184. Since there are inverters at the output of gate 181 and at the inputs of gate 184, the appearance of a true at 182 will cause line 185 to go true and will bring 186 close to ground. These are the conditions to resetting circuits 141 and 142, respectively, and thus, if an output exists at gate 180, the entire counter is reset.

Applicants have found that for the disclosed embodiment a 24 bit address code is sufficient. That is to say, the first 24 bits of the received command word constitute the command word of the unit being addressed, and during those 24 bits, the address comparison step takes place. This comparison is enabled by the presence of the compare enable signal from read only memory 150 in a manner as described above. The read only memory is programmed such that, after the 24th bit, the compare enable signal is removed, rendering impossible any further comparison or reset steps. If the unit receiving the address has not been reset in the course of the first 24 bits, the unit is indeed the one addressed. In this condition, the logic circuitry herein described will continue to process the command word. The remainder of the command word contains information relating to actual commands which will be executed by the unit during the succeeding bits of the command word.

The bits immediately following the address bits, in this case the 25th bit, and the corresponding position on the counter, are such that during the 25th bit, the read only memory issues a single "op bit" on the line bearing that label. This signal is directed to input 202 of the "op bit" latch 200. This condition causes "op bit" latch 200 to assume the state of the corresponding data bit and to latch such that an output which reflects this state continuously appears at output 201 until the "op bit" latch is reset. The reset takes place in a manner described herein below. This signal 201 is transmitted to one input of each integrated circuit element 211, 212, 213, and 214 which, for example, can comprise N7474 integrated circuit, circuit element 211, 212, 213 and 214 are parts of the channel lathes 210*a*, 210*b*, 210*c* and 210*d*.

Having latched the "op bit" latch signal onto each of the integrated circuits 211 through 214, it is noted that each of the other inputs to these circuits is preceded by a different one of AND gates 215 through 218. One input of each of these AND gates is connected to the inverse "RZ data" line and the other is connected to the individual channel enabling line (CH1, CH2, CH3, and CH4) for the particular channel latch with which the gate is associated.

Each channel latch is assigned a particular single bit in the command word received which is that bit in which its channel enable signal is present. That is to say, the channel enable signal for the channel of the channel latch 210*a* is a one for the bit following the operation or "op bit." Since gates 215, 216, 217 and 218 are AND gates with inverted inputs, each of these gates will have an output only when both the inverse "RZ data" and inverse channel enable (CH4) signals, shown in the drawing, are low (connoting a one bit on each of them). Thus, if, during the period in which inverse channel enable (CH4) is low and inverse "RZ data" is also low, there will then be an input on integrated circuit 211 from gate 215. This input will cause output 219 of circuit 211 to assume the state of line 201. A true output at 219 is connected to the converter-tuner unit to enable the reception of the channel associated with channel latch 210*a*.

On the other hand, if the received data during the bit in which the channel latch 210*a* is enabled is a zero, then no output will appear at gate 215, and no change will occur at the output 219. Therefore, the enabling ofthe channel latch circuits by means of the data and the appearance of the appropriate channel enable signal will cause the associated channel latch to assume whatever condition the "op bit" latch possesses during that bit. Thus, during the command function of the logic, it is possible to individually turn on or off any channel which is desired while being able to leave unaffected any channels which are intended to remain the same condition.

At the output of each of the integrated circuits of 211 through 214 is a buffer amplifier, these being designated 211*c*, 212*c*, 213*c*, and 214*c*. These amplifiers serve to isolate the integrated circuit from transients which might be created when switching between the multiplicity of outputs available, which transients might induce the integrated circuit of one of the channel latches to lock in the true state without a command for a true state having been received.

Each of the RC circuits 220, 221, 222, 223 extending between the input of each buffer amplifier (211*c*, 212*c*, 213*c* and 214*c*) and ground by way of resistors 224, 225, 226, and 227, respectively, tend to hold the outputs of the flip flops of integrated circuits 211, 212, 213, and 214, respectively to ground. This prevents the flip flops from being actuated by loading them on a random basis if the power to the system is sequentially turned on and off. The capacitors of these RC circuits provide an additional benefit in that they serve as short term memories for true inputs to the buffer amplifiers 211*c*, 212*c*, 213*c*, and 214*c*. The memory effect can prevent the loss of the latched condition in the event of a short term power interruption. Of course, if power is interrupted for a period of time approaching the time constant of a given RC circuit, then the memory effect is lost and any latched channel will become unlatched.

There is also provided a selector switch 38*a* connected to selector 38 for selective engagement with the outputs of each of the channel latches. The selector switch has other wipers 38*b* and 38*c* (FIGS. 4 and 5) which determine which resonant tank circuit is connected to the local oscillator of the tuner to cause the oscillator to generate the appropriate frequency for reception of the selected channel. The wiper 38*a* connects the "channel latch" integrated circuits to a "channel control" point 228 which is permanently wired to the "channel control" terminal of the base of the oscillator of the tuner at capacitor C73.

If a person switches the selector 38 to a particular channel, he will in effect be requesting the tuner to operate on the particular channel and he will be switching to the channel latch related to the particular channel. The tuner, however, will not operate if inverter 230 has a false output in response to the output of any channel latch integrated circuit (211–214) being false. This is caused by the fact that such a false cannot actuate oscillator Q60.

Where a channel latch is actuated to have a true output in response to the receipt of a command, the true output is invert by the buffers (211*c*–214*c*) to a false and subsequently inverted to a true by inverter 230. A true at the output of inverter 230 serve to activate oscillator Q60.

In the lower left corner of FIG. 7, there is shown data presence detector testor 130. Data presence detector 130 includes a retriggerable one shot 134 (N74123, for example) which is fed from the output of edge detector 110 on line 131. When a period time (determined by resistor R17 and capacitor C6) has elapsed between edges, the output 132 of data presence detector 130 fall The period of time is set such that it is somewhat longer than on bit, so that when the bits of the command word stop arriving, the data presence detector 130 will sense the absence of the data and apply signals to leads 132 and 133. Signals on these leads serve to reset the address mismatch latch 170, data change latch 190, the data and clock generator 120, the counter 140, and the op bit latch 200. The circuitry is then ready for the reception of a new command word.

Figures 2, 3:
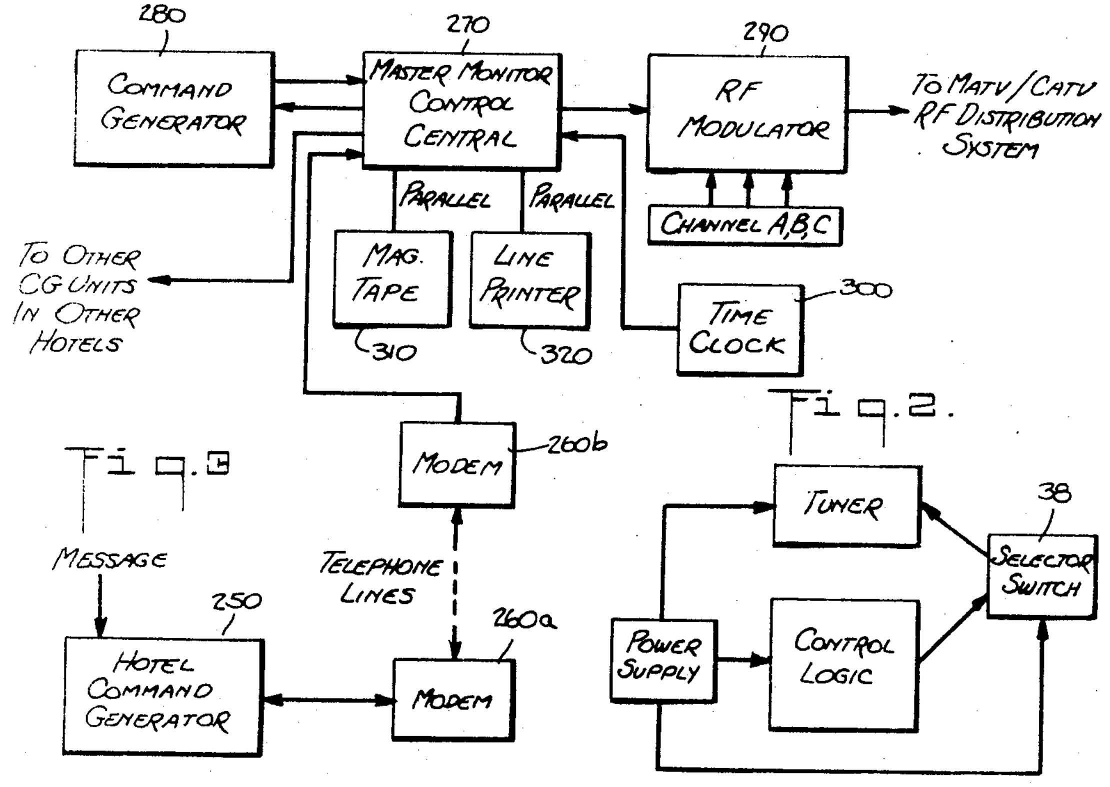
FIG. 2 is a generalized block diagram of a converter-tuner designed for use in connection with the logic circuitry of this invention.
FIG. 3 is a block diagram of the elements of a central command system to be used in conjunction with the circuitry of this invention.

FIG. 3 depicts in block form the central system circuit which is used to control the cable distribution system of which the apparatus described herein and above is a part.

The system includes master monitor control 270 which contains the control circuitry for the remainder of the system. Command generator 280 provides a digital word to the master monitor control 270 which generates tone bursts representing the control command words which are desired to be propagated. When a command word is generated, the master monitor control 270 receives it and direct it to RF modulator 290 where it is modulated on the command signal carrier. Modulator 290 also modulates onto the secure channel carriers, the information constituting the program content of each of the secure channels designated here as channels A, B, C. From the RF modulator all these modulated carriers proceed directly to the main cable of the system which is ultimately connected to each of the subscriber stations.

Such stations may include not only individual subscriber locations, but MATV cables, such as in hotels or apartment buildings, and CATV cables such as are now offered in many locations. Thus, all the modulated carriers are constantly input to each of the ultimate viewing locations of the system.

Each of the ultimate viewing locations whether they are in a hotel, apartment building, or private dwelling, has its own unique address which address is always available for transmission by the command generator. Additionally, when the ultimate viewing location is part of a system such as a CATV system, or a master antenna system in a hotel, it may also be assigned an address within that system which need bear no relationship to its ultimate address as determined by the command generator and the master monitor control. According to the format of the system, a 24-bit address portion of the command word makes possible the existence of hundreds of thousands of unique addresses for ultimate viewing locations.

Each of the systems within the master system, such as a hotel or cable T.V. system, has a hotel command generator 250 associated with it. The hotel command generator is capable of responding to a keyed in message to generate a signal which is interpretable at the master monitor control 270 as calling for the issuances of a command word addressed to a particular box of the main system. The message signal also contains command information regarding changes of state which are to be executed at the addressed box.

The messages generated by the hotel command generator are passed to the master monitor control 270 by way of standard telephone lines, for example. Modern units 260*a* and 260*b* are provided in order to convert the command of the hotel command generator 250 to a form suitable for transmission over phone lines.

If a guest in a hotel calls "room service" and orders a particular program for viewing in his room, "room service" will key in to the hotel command generator a code corresponding to that guest's room. The hotel command generator 250 will then generate a command signal corresponding to the guest room and the command which is to be ordered. The signal is then passed to the master monitor control 270. Master monitor control causes the command generator 280 to generate a command word comprising tone bursts which contain the address of the guest's room converter-tuner and also contain information as to the change of condition be ordered at that viewing station. The command passes through the master monitor control 270 and the RF modulator 290 where it is modulated on the command signal carrier and then transmitted to the guest's room by the hotel cable system. The converter-tuner in the guest's room decodes the address thereby determining that it is indeed the addressee of the command, and responds to the command, thereby rendering the proper channel viewable by the guest.

Other ancillary equipment may optionally be associated with the master monitor control 270. Magnetic tape facility 310 is provided to make a tape record of the occurrence of the command signal. Included in the record is the address of the viewing station, the command to be executed, and the time which is made available to the master monitor control by means of time clock 300. A line printer 320 can also be provided to make a visual copy of the record. The material generated by the magnetic tape facility and line printer may be used for logging, accounting purposes, audience survey data, and the like.

The disclosed logic control system can be applied to environments other than cable television systems since the transmitted and decoded commands can relate to various types of destination equipment which are to be selectively actuated from a central command station.

What is claimed is:

1. Apparatus for decoding a coded signal having a first serial bit pattern forming one of a plurality of different address signals, one of said plurality of address signals corresponding to said apparatus, said apparatus comprising:

a. means responsive to the first serial bit pattern for providing a second serial bit pattern corresponding to the first serial bit pattern of the one address signal, the second serial bit pattern thereby corresponding to the one of the plurality of address signals corresponding to said apparatus, b. means for comparing the second serial bit pattern to the first serial bit pattern of the one address signal by serially comparing the bits of the second serial bit pattern with each of the corresponding bits of the first serial bit pattern of the predetermined one address signal to determine matching between the second serial bit pattern and the one address signal, and c. means responsive to said determination of matching by said comparing means for producing a control signal, whereby said apparatus delivers the control signal only when the one address signal of the plurality of the different address signals is received by said apparatus.

2. Apparatus in accordance with claim 1 in which said means for comparing the second serial bit pattern to the first serial bit pattern to determine matching therewith comprises:

a. an exclusive OR gate having an input connected to receive the serial bit patterns of the one address signal and a second input to receive the second serial bit pattern from said means for providing the second serial bit pattern, said exclusive OR gate in response to the matching of each of the corresponding serial bits of the one address signal and second serial bit patterns at each of its inputs delivering a common output signal; and b. means responsive to a pattern of common output signals from said exclusive OR gate for providing a control signal.

3. Apparatus in accordance with claim 1 in which said means responsive to the one address signal for providing the second serial bit pattern corresponding in format to the first serial bit pattern of the one address signal comprises a read only memory.

4. Apparatus for decoding a coded signal in accordance with claim 1 and further comprising:

a. means connected to said comparing means and responsive to the absence of matching of any portion of the second serial bit pattern to the corresponding portion of the first serial bit pattern of the one address signal for providing a terminating signal; and b. means responsive to the occurrence of the terminating signal for interrupting the decoding by said apparatus, whereby the apparatus is prevented from continuing to decode an address signal having a serial bit pattern which does not match the second serial bit pattern constituting the one address which corresponds to said apparatus.

5. Apparatus in accordance with claim 4 and further comprising means responsive to the determination of matching for actuating said apparatus to decode a subsequent serial bit pattern.

6. Apparatus in accordance with claim 1 in which said means for providing a second serial bit pattern corresponding in format to the first serial bit pattern of the one address signal is also responsive to a special predetermined address unrelated to said apparatus and different from each of the plurality of address signals, said comparing means further actuating said control signal producing means to produce said control signal upon the occurrence of the special address signal.

7. Apparatus for decoding a coded signal having a first serial bit pattern forming one of a plurality of different address signals, one address signal of said plurality corresponding to said apparatus, and another serial bit pattern forming a command signal said apparatus comprising:

a. means responsive to the occurrence of the first serial bit pattern for providing a second serial bit pattern corresponding to the first serial bit pattern; ;

b. means for comparing the first and second serial bit patterns to determine matching therebetween;

c. means connected to said comparing means and being responsive to said determination of matching for producing an enabling signal;

d. means responsive to the occurrence of the enabling signal for actuating said apparatus to decode the serial bit pattern of the command signal; and e. means connected to said command decoding actuation means for providing a second control signal in response to and which is a function of said decoding of said command signal.

8. Apparatus in accordance with claim 7 in which said means for comparing the first and second serial bit patterns serially compares each of the bits of the second serial bit pattern with each of the corresponding bits of the first serial bit pattern.

9. Apparatus in accordance with claim 8 in which said means for comparing the first and second serial bit pattern comprises:

a. an exclusive OR gate having an input connected to receive the first serial bit patterns and a second input to receive the second serial bit patterns from said means for providing a second serial bit pattern, said exclusive OR gate in response to the correspondence of each of the serial bits of the first and second serial bit patterns at each of its inputs delivering a common output signal; and b. means responsive to a pattern of common output signals from said exclusive OR gate for providing a second control signal.

10. Apparatus in accordance with claim 7 in which said means responsive to the first serial bit pattern for providing a second serial bit pattern corresponding to the first serial bit pattern comprises a read only memory.

11. Apparatus for decoding a coded signal in accordance with claim 7 and further comprising:

a. means connected to said comparing means and responsive to the absence of correspondence of any portion of the second serial bit pattern to the first serial bit pattern for providing a terminating signal; and b. means responsive to the occurrence of the terminating signal for interrupting the decoding by said apparatus, whereby the apparatus is prevented from continuing to decode a coded signal having a first serial bit pattern which does not form the one address.

12. Apparatus in accordance with claim 11 further comprising means responsive to the end of first serial bit pattern following said terminating signal for reactivating said apparatus to decode a later occurring coded signal.

13. Apparatus in accordance with claim 7 in which said means responsive to the first serial bit pattern for providing a second serial bit pattern is also responsive to a special predetermined address signal unrelated to said apparatus and different from the one address, said comparing means providing said enabling signal upon the occurrence of the special predetermined address.

14. In a remotely controlled communication system apparatus for decoding a coded signal having a first serial bit pattern forming one of a plurality of predetermined address signals, said one address signal being related to said apparatus, on improvement comprising:

a. means responsive to the first serial bit pattern for providing a second serial bit pattern corresponding to the one address of the first serial bit pattern;

b. means for comparing the second serial bit pattern to the first serial bit pattern to determine correspondence therewith; and c. means responsive to the determination of the correspondence by said comparing means for producing a control signal, whereby said apparatus delivers a control signal only upon the occurrence of the one address signal.

15. In a remotely controlled communication system apparatus for decoding a coded signal having a first serial bit pattern forming one of a plurality of address signals, one of said plurality of address signals being related to said apparatus and another serial bit pattern forming a command signal an improvement comprising:

a. means responsive to the first serial bit pattern for providing a second serial bit pattern corresponding to the first serial bit pattern;
b. means for comparing the second serial bit pattern to the first serial bit pattern to determine correspondence therebetween;
c. means responsive to the determination of the correspondence by said comparing means for producing an enabling signal;
d. means responsive to the occurrence of the enabling signal for decoding the serial bit pattern of the command signal; and
e. means for providing a second control signal in response to the decoded command signal.

16. Apparatus for decoding a coded signal transmitted thereto, the coded signal bearing information represented by the occurrence in the signal of at least one of a plurality of conditions within each of a succession of defined bit cells, said information including a first serial bit pattern said apparatus comprising:

a. means for detecting the coded signal;
b. means for storing a predetermined signal, the predetermined signal comprising a second serial bit patter having bit cells corresponding to at least some of the bit cells of the first serial bit pattern of the coded signal;
c. generation means connected to said storing means for causing said storing means to generate the predetermined signal;
d. means connected to said storing means and to said detecting means for successively comparing the respective conditions of the second serial bit pattern of the predetermined signal with the respective states of the first serial bit pattern of the coded signal; and
e. means connected to said comparing means and being responsive to a predetermined relation between the states of the second serial bit pattern of the predetermined signal and the first serial bit pattern of the coded signal for producing an output signal to interrupt the operation of the apparatus.

17. The apparatus of claim 16 in which said apparatus is assigned an address, the address being representable by the information borne by an address portion of the signal including the first serial bit pattern the signal further including a command portion representing a command to be executed by the apparatus, the command portion including another serial bit pattern having at least one command bit cell of the signal following the address bit cells, the second serial bit pattern consisting of second address bit cells, said apparatus further comprising:

a. means connected to said storage means and said comparing means for enabling comparison by said comparing means only of the first and second serial bit patterns of the signal and predetermined signal, and
b. means for registering a response to the signal associated with the command bit cell thereof, the registration being contingent upon the completion of comparison of the first serial bit pattern of the coded signal and the second serial bit pattern of the predetermined signal.

18. The apparatus of claim 17, in which said output signal producing means is responsive to the mismatch of condition of corresponding address bit cells of the predetermined signal and the signal to disable said comparing means before the termination of comparison of the address portions, whereby the apparatus is prevented from responding to the command bit cell in all cases in which the respective address portions of the signal and the predetermined signal do not exactly correspond.

19. The apparatus of Claim 18, further comprising:

a. said registering means being responsive to register a response to the command bit cell only after receipt of a data enabling signal;
b. operation bit generation means connected to said registering means and associated with said generation means for producing operation bit signal and transmitting the operation bit signal to said registering means between the address bit cells and the command bit cell of the signal.

20. The apparatus of claim 18, further comprising:

a. said registering means being responsive to register a response to the condition of the data signal during the command bit cell only simultaneously with the receipt by the registering means of a second enabling signal; and
b. second generation means connected to said registering means and associated with said generation means and being responsive to the receipt of the signal during the command bit cell to produce and transmit to said registering means the second enabling signal during the command bit cell.

21. The apparatus of claim 17 in which:

said comparing means comprises an exclusive OR gate having a first input connected to said detecting means and a second input connected to said storing means, whereby both the signal and the predetermined signal may be compared during the address bit cells thereof.

22. The apparatus of claim 18, in which said registering means comprises:

a latch circuit having a two stage output, the condition of the output being latchable in one of the states in partial response to receipt of a predetermined condition of the signal during the command bit cell.

23. The apparatus of claim 17, in which the signal is capable of assuming first and second conditions, the first and second conditions being the presence and absence, respectively of a tone burst, said detecting means of said apparatus comprising:

a. a tone burst detector connected to receive the signal for producing an output including first and second stages, the first stage corresponding to the first condition, the second stage corresponding to the second condition; and
b. an edge detector connected to the output of said tone burst detector for generating at its output a pulse whenever the output of the tone detector changes states.

24. The apparatus of claim 23 in which said tone burst detector comprises:

a retriggerable one shot circuit connected to receive the tone bursts and having an output, the time of said one shot being greater than the period of the wave of the tone bursts, whereby said tone burst detector produces a substantially rectangular waveform at the output of said retriggerable one shot substantially only during the presence of the tone bursts regardless of distortion which may exist in the tone bursts.

25. The apparatus of claim 24, the signal being encoded in a split phase mark digital binary manner in which the condition of the signal representing a logical one bit is characterized by a change of state of the tone burst between presence and absence thereof approximately in the center of its corresponding bit cell, and the condition of the signal representing a logical zero bit is characterized by the absence of a change of state of the tone burst between presence and absence thereof during its associated bit cell, said apparatus further comprising a data and clock generator means connected to said detector for generating a clock signal at the beginning of each bit cell of the signal and for producing a data signal having a first state during bit cells of the signals in which the signal represents a logical one bit and a second state during bit cells of the signals in which the signals represent a logical zero bit.

26. The apparatus of claim 17, further comprising:

a. data and clock generator means connected to said detecting means for generating a clock pulse at the beginning of each bit cell of the signal, and for generating a data signal having a state dependent upon the condition of the signal during the bit cell of the signal during which the data signal is generated;

b. said generation means comprising a counter connected to receive the clock signal, said counter having an output which output has a succession of condition, the condition being dependent on the position of the counter in its count sequence, said counter being responsive to each clock signal pulse to advance one position in its count sequence; and c. said storing means comprises a read only memory having an output and having an input connected to the output of said counter, said read only memory being preprogrammed to generate at its output a predetermined sequence of output profiles, the location of said profile in the sequence at a given time being a function of the position of said counter in its count sequence.

27. The apparatus of claim 25, in which said data and clock generator means comprises:

a nonretriggerable one shot circuit connected to said detecting means, the time of said one shot being greater than one half the duration of the bit cells of the signals, whereby said nonretriggerable one shot circuit is induced by the signal to emit a pulse at the beginning of each bit cell of the signal but is not affected by any changes of state of the signal occurring near the midpoint of any bit cell of the signal.

28. The apparatus of claim 17, further comprising:

a data presence detector being responsive to the absence of receipt of the signal by said detecting means to reset each of said generation, storing, and comparing means to their respective states prior to reception of the signal, whereby the apparatus is prepared to analyze another signal.

29. A method for decoding a coded signal having a first serial bit pattern forming one of a plurality of predetermined addresses said one address corresponding to a particular apparatus said method comprising the steps of:

a. providing a second serial bit pattern corresponding to the first serial bit pattern of the one address in response to the first serial bit pattern;

b. serially comparing the second serial bit pattern to the first serial bit pattern to determine matching therebetween; and c. producing a control signal in response to the determination of matching by the comparing step whereby a control signal is delivered only upon the occurrence of the one address.

30. A method in accordance with claim 29 and further comprising the steps of:

a. providing a terminating signal in response to the absence of matching between the first and second serial bit patterns; and b. interrupting the decoding in response to the occurrence of the terminating signal, whereby the decoding of a coded signal having a first serial bit pattern which does not form the one address is not permitted to proceed to completion.

31. A method in accordance with claim 30 and further comprising the step of reactivating the operation to decode a subsequent coded signal in response to the termination of the end of a first serial bit pattern.

32. A method in accordance with claim 29 in which the step of providing a second serial bit pattern is also executed in response to a special predetermined address serial bit pattern different from the one address, said comparing step determining correspondence upon the occurrence of the special predetermined address serial bit pattern.

33. A method for decoding a coded signal having a first serial bit pattern representing one of a plurality of address signals for an apparatus and another serial bit pattern representing a command signal said method comprising the steps of:

a. providing a second serial bit pattern corresponding to the first serial bit pattern of the one address in response only to the occurrence of the first serial bit pattern;

b. serially comparing the bits of the second serial bit pattern to those of the first serial bit pattern to determined matching therebetween;

c. producing an enabling signal in response to the determination of matching in said comparing step;

d. decoding the another serial bit pattern of the command signal in response to the occurrence of the enabling signal; and e. providing a control signal in response to the decoded command signal.

34. A method for decoding a coded signal in accordance with claim 33 and further comprising the steps of:

a. providing a terminating signal in response to the absence of matching between the second serial bit pattern and the first serial bit pattern; and b. interrupting the decoding in response to the occurrence of the terminating signal, whereby the decoding of a coded signal having a first serial bit pattern which does not form the one address is interrupted.

35. A method in accordance with claim 34 and further comprising the step of reactivating the decoding of a subsequent serial bit pattern in response to the termination of the end of an address signal following the terminating signal.

36. A method in accordance with claim 33 in which the step of providing a second serial bit pattern corresponding to the first serial bit pattern of the one address in response to occurrence of the first serial bit pattern is also responsive to a special predetermined address different from any of the plurality of addresses, said comparing step determining matching upon the occurrence of the special predetermined address.

* * * * *

UNITED STATES PATENT OFFICE

CERTIFICATE OF CORRECTION

Patent No. 3,835,387 Dated September 10, 1974

Inventor(s) Ernest F. Rooks and David E. Lewis

It is certified that error appears in the above-identified patent and that said Letters Patent are hereby corrected as shown below:

Column 5, line 17, "modulated" should be --demodulated--.

Column 11, lines 51 and 52,"Counter 1" should be -- Counter 140 --.

Column 17, line 33, after "Memory 151" insert --before--.

Column 18, line 47, "It" should be --If--.

Column 20, line 3, after "remain" insert --in--.

Column 20, line 64, after "period" insert --of--.

Column 20, line 67, "fall" should be --falls--.

Column 20, line 68, "on" should be --one--.

Column 21, line 20, "direct" should be --directs--.

Column 21, line 61, "Modern" should be --Modem--.

Column 25, line 27, change "patter" to --pattern--.

Signed and sealed this 11th day of March 1975.

(SEAL)
Attest:

RUTH C. MASON
Attesting Officer

C. MARSHALL DANN
Commissioner of Patents
and Trademarks

USCOMM-DC 60376-P69
☆ U.S. GOVERNMENT PRINTING OFFICE : 1969 O—366-334.